(12) United States Patent
Viswanathan

(10) Patent No.: US 9,095,837 B2
(45) Date of Patent: Aug. 4, 2015

(54) RENEWABLE RESOURCE-BASED METAL OXIDE-CONTAINING MATERIALS AND APPLICATIONS OF THE SAME

(71) Applicant: Board of Trustees of the University of Arkansas, Little Rock, AR (US)

(72) Inventor: Tito Viswanathan, Little Rock, AR (US)

(73) Assignee: BROAD OF TRUSTEES OF THE UNIVERSITY OF ARKANSAS, Little Rock, AR (US)

(*) Notice: Subject to any disclaimer, the term of this patent is extended or adjusted under 35 U.S.C. 154(b) by 99 days.

(21) Appl. No.: 13/843,106

(22) Filed: Mar. 15, 2013

(65) Prior Publication Data

US 2013/0233802 A1    Sep. 12, 2013

Related U.S. Application Data

(63) Continuation-in-part of application No. 13/335,418, filed on Dec. 22, 2011, now Pat. No. 8,574,337, which is a continuation-in-part of application No. 13/069,097, filed on Mar. 22, 2011, now Pat. No.

(Continued)

(51) Int. Cl.
*B01J 20/02* (2006.01)
*B01J 20/24* (2006.01)
(Continued)

(52) U.S. Cl.
CPC *B01J 20/02* (2013.01); *B01J 20/24* (2013.01); *B01J 20/3085* (2013.01); *C02F 1/288* (2013.01); *C02F 1/281* (2013.01); *C02F 1/286* (2013.01); *C02F 2101/103* (2013.01); *C02F 2101/105* (2013.01); *C02F 2101/106* (2013.01); *C02F 2305/08* (2013.01)

(58) Field of Classification Search
USPC .......................... 75/370, 345; 977/896, 901
See application file for complete search history.

(56) References Cited

U.S. PATENT DOCUMENTS

| | | |
|---|---|---|
| 3,803,033 A | 4/1974 | Sutherland |
| 3,886,093 A | 5/1975 | Dimitri |

(Continued)

FOREIGN PATENT DOCUMENTS

| | | |
|---|---|---|
| CN | 1876566 A | 12/2006 |
| CN | 1911792 | 2/2007 |

(Continued)

OTHER PUBLICATIONS

Kim et al. "Preparation and Characterization of 1-2 nm Dendrimer-Encapsulated Gold Nanoparticles Having Very Narrow Size Distributions". Chem. Mater. 2004 (16) pp. 167-172.*

(Continued)

*Primary Examiner* — George Wyszomierski
*Assistant Examiner* — Tima M McGuthry Banks
(74) *Attorney, Agent, or Firm* — Locke Lord LLP; Tim Tingkang Xia, Esq.

(57) ABSTRACT

Metal nanocomposites and methods of producing the same are disclosed. The nanocomposites have metal nanoparticles dispersed in a matrix carrier and can be produced by: treating a matrix material having a functional group with a quaternary amine compound to form a function site; treating the matrix material with a metal salt such that a metal ion of the metal salt is chelated with the functional site; treating the matrix material with an alkali; and microwaving the matrix material to form the metal nanocomposites.

9 Claims, 10 Drawing Sheets

Related U.S. Application Data 8,790,615, said application No. 13/335,418 is a continuation-in-part of application No. 12/487,323, filed on Jun. 18, 2009, said application No. 13/335,418 is a continuation-in-part of application No. 12/487,174, filed on Jun. 18, 2009, now Pat. No. 8,167,973.

(60) Provisional application No. 61/316,669, filed on Mar. 23, 2010, provisional application No. 61/132,380, filed on Jun. 18, 2008.

(51) Int. Cl.
*B01J 20/30* (2006.01)
*C02F 1/28* (2006.01)
*C02F 101/10* (2006.01)

(56) References Cited

U.S. PATENT DOCUMENTS

| | | | |
|---|---|---|---|
| 4,019,995 | A | 4/1977 | Briggs |
| 4,108,767 | A | 8/1978 | Cooper |
| 4,457,853 | A | 7/1984 | Detroit |
| 4,985,225 | A | 1/1991 | Hashimoto |
| 5,604,037 | A | 2/1997 | Ting |
| 5,972,537 | A | 10/1999 | Mao |
| 6,099,990 | A | 8/2000 | Denton |
| 6,232,264 | B1 | 5/2001 | Lukehart |
| 6,486,008 | B1 | 11/2002 | Lee |
| 6,733,827 | B2 | 5/2004 | Mitchell |
| 6,764,617 | B1 | 7/2004 | Viswanathan |
| 7,119,179 | B1 | 10/2006 | Huynh et al. |
| 7,220,484 | B2 | 5/2007 | Ton-that |
| 7,297,652 | B2 | 11/2007 | Jhung |
| 7,303,679 | B2 | 12/2007 | Ulicny |
| 7,358,325 | B2 | 4/2008 | Hayes |
| 7,758,755 | B2 * | 7/2010 | Diallo .......................... 210/644 |
| 7,758,756 | B2 | 7/2010 | Kim |
| 7,985,424 | B2 * | 7/2011 | Tomalia et al. ............... 424/486 |
| 8,454,721 | B2 * | 6/2013 | Allemand ....................... 75/343 |
| 2002/0064495 | A1 | 5/2002 | Miura |
| 2004/0147397 | A1 | 7/2004 | Miller |
| 2005/0139550 | A1 | 6/2005 | Ulicny |
| 2005/0181941 | A1 | 8/2005 | Sugo |
| 2005/0186344 | A1 | 8/2005 | Takagi |
| 2005/0271816 | A1 | 12/2005 | Meschke |
| 2006/0134716 | A1 * | 6/2006 | Gouma .......................... 435/18 |
| 2007/0129233 | A1 | 6/2007 | Ueno |
| 2007/0142225 | A1 | 6/2007 | Baker |
| 2007/0218564 | A1 | 9/2007 | Bachmann |
| 2007/0243337 | A1 | 10/2007 | Xiong |
| 2007/0264574 | A1 | 11/2007 | Kim |
| 2007/0266825 | A1 | 11/2007 | Ripley |
| 2008/0017291 | A1 | 1/2008 | Shin |
| 2008/0160306 | A1 | 7/2008 | Mushtaq |
| 2008/0185341 | A1 * | 8/2008 | Diallo .......................... 210/651 |
| 2010/0015030 | A1 | 1/2010 | Mamakhel et al. |
| 2010/0200501 | A1 | 8/2010 | Hoag |
| 2010/0283005 | A1 | 11/2010 | Pickett |

FOREIGN PATENT DOCUMENTS

| | | |
|---|---|---|
| CN | 101402057 | 4/2009 |
| WO | 0123501 A | 4/2001 |
| WO | 2008127757 A2 | 10/2008 |

OTHER PUBLICATIONS

Oh et al. "Synthesis, Characterization, and Surface Immobilization of Metal Nanoparticles Encapsulated within Bifunctionalized Dendrimers". Langmuir 2003 (19). pp. 10420-10425.*

Scott et al. "Synthesis, Characterization, and Applications of Dendrimer-Encapsulated Nanoparticles". J. Phys. Chem B. 2005 (109) pp. 692-704.*

Antal et al., Flash carbonization of biomass, Industrial & Engineering Chemistry Research, 2003, 42(16), 3690-3699.

Bao et al., A novel nanostructure of nickel nanotubes encapsulated in carbon nanotubes, Chemical Communications, Cambridge, United Kingdom, 2003, (2), 208-209.

Bender et al., Total Phosphorous in Residual Materials, In Methods of Phosphorus Analysis for Soils, Sediments, Residuals, and Waters, Pierzynski, G.M., Ed. Southern Cooperative Series Bulletin No. 396. 2000.

Chen et al., Microwave-assisted synthesis of carbon supported Pt Nanoparticles for fuel cell applications, Chemical Communications, Cambridge, United Kingdom, 2002, (21), 2588-2589.

Compere et al., Low cost carbon fiber from renewable resources, Oak Ridge National Laboratory, Oak Ridge TN, USA, International Sampe Technical Conference, 2001, 33, 1306-1314, Society for the Advancement of Material and Process Engineering.

Hu et al., Microwave-assisted synthesis of a superparamagnetic surface-functionalized porous $Fe_3O_4$/C nanocomposite, Chemistry—An Asia Journal, 2006, 1(4), 605-610.

Kang et al., Obtaining carbon nanotubes from grass, Nanotechnology, 2005, 16(8), 1192-1195.

Kubo et al., Carbon fibers from Lignin-recyclable plastic blends, Encyclopedia of Chemical Processing, vol. 1, 2003, Sunggyu Lee, CRC Press pp. 317-332.

Lagashetty et al., Microwave-assisted route for synthesis of nanosized metal oxides, Science and Technology of Advanced Materials, 2007, 8(6), 484-493.

Liu, Shuling; Liu, Xinzheng; Xu, Liqiang; Qian, Yitai; Ma, Xicheng. Controlled synthesis and characterization of nickel phosphide nanocrystal. Journal of Crystal Growth (2007), 304(2), 430-434.

Marina Sofos et al., A synergistic assembly of nanoscale lamellar photoconductor hybrids, Nature Materials, 2009, 68-75, vol. 8, Nature Publishing Group.

Mayo JT, Yavuz C, Yean S, Cong L, Shipley H, Yu W, Falkner J, Kan A, Tomson M, Colvin VL, The effect of nanocrystalline magnetite size on arsenic removal, Science and Technology of Advanced Materials (2007), 8(1-2), 71-75.

Meng Qinghan et al., Copper-doped mesoporous activated carbons as electrode material for electrochemical capacitors, Journal of Applied Electrochemistry, 2006, 36(1), 63-67.

Osswald et al., Control of sp2/sp3 Carbon Ratio and Surface Chemistry of Nanodiamond Powders by Selective Oxidation in Air, J. Am. Chem. Soc., 2006, 128(35), pp. 11635-11642.

Oyama, Novel catalysts for advanced hydroprocessing: transition metal phosphides, Journal of Catalysis, 2003, 216 (1-2), 343-352.

Oyama, S. T.; Wang, X.; Requejo, F. G.; Sato, T.; Yoshimura, Y. Hydrodesulfurization of Petroleum Feedstocks with a New Type of Nonsulfide Hydrotreating Catalyst. Journal of Catalysis (2002), 209(1), 1-5.

Oyama, S. Ted; Lee, Yong-Kul. Mechanism of Hydrodenitrogenation on Phosphides and Sulfides. Journal of Physical Chemistry B (2005), 109(6), 2109-2119.

Rao et al., Synthesis of Inorganic Solids Using Microwaves, Chemistry of Materials, 1999, 11(4), 882-895.

Shipley HJ, Yean S, Kan AT, Tomson MB, Adsorption of arsenic to magnetite nanoparticles: effect of particle concentration, pH, ionic strength, and temperature, Environmental Toxicology and Chemistry (2009), 28(3), 509-515.

Vaclavikova M, Gallios GP, Hredzak S, Jakabsky S, Removal of arsenic from water streams: an overview of available techniques, Clean Technologies and Environmental Policy (2008), 10(1), 89-95.

Vivas, N.; Bourgeois, G.; Vitry, C.; Glories, Y.; de Freitas, V., "Determination of the composition of commercial tannin extracts by liquid secondary ion mass spectrometry" J. Sci. Food Agric., 1996, 72, 309-317.

Walkiewicz et al., Microwave heating characteristics of selected minerals and compounds, Minerals & Metallurgical Processing, 1988, 5(1), 39-42.

(56) References Cited

OTHER PUBLICATIONS

Wang, Xinjun; Han, Kun; Gao, Youjun; Wan, Fuquan; Jiang, Kai. Fabrication of novel copper phosphide (Cu3P) hollow spheres by a simple solvothermal method. Journal of Crystal Growth (2007), 307(1), 126-130.

Wei Liu et al., A Novel Carbothermal Method for the Preparation of Nano-sized WC on High Surface Area Carbon, Chemistry Letters, 2006, 1148-1149, vol. 35, No. 10, The Chemical Society of Japan, Tsukuba, Japan.

Xie, Songhai; Qiao, Minghua; Zhou, Wuzong; Luo, Ge; He, Heyong; Fan, Kangnian; Zhao, Tiejun; Yuan, Weikang. Controlled synthesis, characterization, and crystallization of Ni—P nanospheres. Journal of Physical Chemistry B (2005), 109(51), 24361-24368.

Xu et al., Preparation and characterization of NiO nanorods by thermal decomposition of NiC2O4 precursor, Journal of Materials Science, 2003, 38(4), 779-782.

Yu et al., Microwaved-assisted synthesis and in-situ self-assembly of coaxial Ag/C nanotubes, Chemical Communications, Cambridge, United Kingdom, 2005, 21, 2704-2706.

Zhang et al., Microwave synthesis of nanocarbons from conducting polymers, Chemical Communications, Cambridge, United Kingdom, 2006, (23), 2477-2479.

Zhu et al., Enhanced field emission from O2 and CF4 plasma-treated CuO nanowires, Chemical Physics Letters, 2006, 419(4-6), 458-463.

\* cited by examiner

RENEWABLE RESOURCE-BASED METAL OXIDE-CONTAINING MATERIALS AND APPLICATIONS OF THE SAME

CROSS-REFERENCE TO RELATED PATENT APPLICATION

This application is a continuation-in-part of U.S. patent application Ser. No. 13/335,418 (the '418 application), filed on Dec. 22, 2011, entitled "RENEWABLE RESOURCE-BASED METAL-CONTAINING MATERIALS AND APPLICATIONS OF THE SAME" by Tito Viswanathan, which is incorporated herein by reference in its entirety.

The '418 application is a continuation-in-part of U.S. patent application Ser. No. 13/069,097, filed on Mar. 22, 2011, entitled "METHODS OF SYNTHESIZING CARBON-MAGNETITE NANOCOMPOSITES FROM RENEWABLE RESOURCE MATERIALS AND APPLICATION OF SAME" by Tito Viswanathan, which is incorporated herein by reference in its entirety and which claims the benefit, pursuant to 35 U.S.C. §119(e), of U.S. Provisional Patent Application Ser. No. 61/316,669, filed Mar. 23, 2010, entitled "USE OF MAGNETIC CARBON COMPOSITES FROM RENEWABLE RESOURCE MATERIALS FOR REMOVAL OF ARSENIC FROM CONTAMINATED WATER," by Tito Viswanathan, which is incorporated herein by reference in its entirety.

The '418 application is also a continuation-in-part of U.S. patent application Ser. No. 12/487,323, filed on Jun. 18, 2009, entitled "MICROWAVE-ASSISTED SYNTHESIS OF CARBON AND CARBON-METAL COMPOSITES FROM LIGNIN, TANNIN AND ASPHALT DERIVATIVES AND APPLICATIONS OF SAME," by Tito Viswanathan, which is incorporated herein by reference in its entirety and which claims the benefit, pursuant to 35 U.S.C. §119(e), of U.S. Provisional Patent Application Ser. No. 61/132,380, filed Jun. 18, 2008, entitled "MICROWAVE-ASSISTED SYNTHESIS OF CARBON AND CARBON-METAL COMPOSITES FROM LIGNIN, TANNIN AND ASPHALT DERIVATIVES," by Tito Viswanathan, which is incorporated herein by reference in its entirety.

The '418 application is also a continuation-in-part of U.S. patent application Ser. No. 12/487,174, filed on Jun. 18, 2009, entitled "MICROWAVE-ASSISTED SYNTHESIS OF CARBON AND CARBON-METAL COMPOSITES FROM LIGNIN, TANNIN AND ASPHALT DERIVATIVES," by Tito Viswanathan, now U.S. Pat. No. 8,167,973, issued May 1, 2012, which is incorporated herein by reference in its entirety and which claims the benefit, pursuant to 35 U.S.C. §119(e), of U.S. Provisional Patent Application Ser. No. 61/132,380, filed Jun. 18, 2008, entitled "MICROWAVE-ASSISTED SYNTHESIS OF CARBON AND CARBON-METAL COMPOSITES FROM LIGNIN, TANNIN AND ASPHALT DERIVATIVES," by Tito Viswanathan, which is incorporated herein by reference in its entirety.

This application is related to copending U.S. patent application Ser. No. 13/069,132, filed on Mar. 22, 2011, entitled "MICROWAVE-ASSISTED SYNTHESIS OF CARBON NANOTUBES FROM TANNIN, LIGNIN, AND DERIVATIVES," by Tito Viswanathan, which is incorporated herein by reference in its entirety and which claims the benefit, pursuant to 35 U.S.C. §119(e), of U.S. Provisional Patent Application Ser. No. 61/316,682, filed on Mar. 23, 2010, entitled "MICROWAVE-ASSISTED SYNTHESIS OF CARBON NANOTUBES FROM TANNIN, LIGNIN, AND DERIVATIVES," by Tito Viswanathan, which is incorporated herein by reference in its entirety.

This application is also related to copending U.S. patent application Ser. No. 13/069,057, filed on Mar. 22, 2011, entitled "MICROWAVE-ASSISTED SYNTHESIS OF NANODIAMONDS FROM TANNIN, LIGNIN, ASPHALT AND DERIVATIVES," by Tito Viswanathan, which is incorporated herein by reference in its entirety and which claims the benefit, pursuant to 35 U.S.C. §119(e), of U.S. Provisional Patent Application Ser. No. 61/316,654, filed Mar. 23, 2010, entitled "MICROWAVE-ASSISTED SYNTHESIS OF NANODIAMONDS FROM TANNIN, LIGNIN, ASPHALT AND DERIVATIVES," by Tito Viswanathan, which is incorporated herein by reference in its entirety.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

STATEMENT OF FEDERALLY-SPONSORED RESEARCH

This disclosure was made with Government support under SURF grant No. O8-EPSC0R-009-REU awarded by NSF-EPSCOR and grant No. DEFC 36-06G086072 awarded by DOE. The Government has certain rights in the disclosure.

FIELD OF THE INVENTION

The present disclosure relates generally to renewable resource-based metal oxide-containing materials, and more particularly to a quarternized renewable resource-based metal oxide-containing nanocomposites.

BACKGROUND OF THE INVENTION

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

In certain aspects, nanoparticles are superior to conventional large particles due to, among other things, their great surface area per weight. Carbon metal nanocomposites having nanoparticles represent a new class of materials with niche applications in a variety of areas. Therefore, there is a need to develop different materials with nanostructures according to specific requirements for various applications to improve their efficiency.

SUMMARY OF THE INVENTION

Certain aspects of the present disclosure are directed to a method of producing metal nanocomposites. The method includes treating a matrix material having a functional group with a quaternary amine compound to form a function site; treating the matrix material with a metal salt such that a metal ion of the metal salt is chelated with the functional site; treating the matrix material with an alkali; and microwaving the matrix material to form the metal nanocomposites.

In certain embodiments, the starting matrix material is selected from the group consisting of wood, cellulose, chitin, lignin, tannin, silk, protein, wool, chitosan, and derivatives thereof.

In certain embodiments, the functional group of the starting matrix material is selected from the group consisting of amino group, hydroxyl group, thiol group, and combination thereof.

In certain embodiments, the quat is selected from the group consisting of 3-chloro-2-hydroxypropyl trimethyl ammonium chloride, 1,3-bis(trimethylammonium)-2-hydroxypropane dichloride, glycidyl trimethyl ammonium chloride, and combination thereof.

In certain embodiments, the metal ion of the metal salt is selected from the group consisting of $Fe^{3+}$, $Fe^{2+}$, $Ni^{2+}$, $Co^{2+}$, $Au^{3+}$, $Pt^{2+}$, $Pt^{4+}$, $Al^{3+}$, $Ti^{4+}$, $Ag^{+}$, $Pd^{2+}$, $Cu^{2+}$, $Cu^{+}$, $Mn^{2+}$, $Si^{4+}$, $Zr^{+4}$, $Sb^{+2}$, $Bi^{3+}$, $Zn^{2+}$, $Al^{3+}$, $W^{6+}$, $Ba^{2+}$, $Cr^{3+}$, $Sn^{4+}$, $Mo^{6+}$, and combination thereof.

In certain embodiments, the anion of the metal salt is selected from the group consisting of chloride, acetate, nitrate, sulfate, and combination thereof.

In certain embodiments, the alkali is selected from the group consisting of sodium hydroxide, potassium hydroxide, calcium hydroxide, ammonia solution (ammonium hydroxide), ammonia gas, and combination thereof.

In certain embodiments, the plurality of metal components of the metal nanocomposites is magnetic.

In certain embodiments, a method of purifying contaminated water includes contacting the contaminated water with a media containing the metal nanocomposites produced above.

Certain aspects of the present disclosure are directed to a metal nanocomposite. The metal nanocomposite includes a matrix carrier having a plurality of function sites, and a plurality of metal nanoparticles dispersed on the surface of the matrix carrier and chelated with the functional sites. The functional sites are selected from the group consisting of —O—CH$_2$—CH(OH)—, —S—CH2-CH(OH)—, —N(CH2-CH(OH))2-, and combination thereof.

In certain embodiments, a plurality of metal components in the metal nanoparticles is selected from the group consisting of $Fe_3O_4$, $FeO$, $Fe$, or $Fe_2O_3$.

In certain embodiments, the matrix carrier is derived from the group consisting of wood, cellulose, chitin, lignin, tannin, silk, protein, wool, chitosan, and derivatives thereof.

In certain embodiments, the matrix carrier comprises pure carbon and carbon compound.

In certain embodiments, the nanoparticles are formed in a cluster.

In certain embodiments, metals of the metal nanoparticles are selected from the group consisting of $Fe^{3+}$, $Fe^{2+}$, $Ni^{2+}$, $Co^{2+}$, $Au^{3+}$, $Pt^{2+}$, $Pt^{4+}$, $Al^{3+}$, $Ti^{4+}$, $Ag^{+}$, $Pd^{2+}$, $Cu^{2+}$, $Cu^{+}$, $Mn^{2+}$, $Si^{4+}$, $Zr^{+4}$, $Sb^{+2}$, $Bi^{3+}$, $Zn^{2+}$, $Al^{3+}$, $W^{6+}$, $Ba^{2+}$, $Cr^{3+}$, $Sn^{4+}$, $Mo^{6+}$, and combination thereof.

In certain embodiments, at least one of the metals in the metal nanoparticles is magnetic.

Certain aspects of the present disclosure are directed to a method of producing metal nanocomposites. The method includes treating a matrix material having a —OH group with a reagent to form a —O—CH$_2$—CH(OH)— group; treating the matrix material with a metal salt such that a metal ion of the metal salt is chelated with the —O—CH$_2$—CH(OH)— group; treating the matrix material with an alkali; and microwaving the matrix material to form the metal nanocomposites.

In certain embodiments, the reagent is selected from the group consisting of 3-chloro-2-hydroxypropyl trimethyl ammonium chloride, 1,3-bis(trimethylammonium)-2-hydroxypropane dichloride, glycidyl trimethyl ammonium chloride, and combination thereof.

In certain embodiments, the metal of the metal salt is selected from the group consisting of $Fe^{3+}$, $Fe^{2+}$, $Ni^{2+}$, $Co^{2+}$, $Au^{3+}$, $Pt^{2+}$, $Pt^{4+}$, $Al^{3+}$, $Ti^{4+}$, $Ag^{+}$, $Pd^{2+}$, $Cu^{2+}$, $Cu^{+}$, $Mn^{2+}$, $Si^{4+}$, $Zr^{+4}$, $Sb^{+2}$, $Bi^{3+}$, $Zn^{2+}$, $Al^{3+}$, $W^{6+}$, $Ba^{2+}$, $Cr^{3+}$, $Sn^{4+}$, $Mo^{6+}$, and combination thereof.

In certain embodiments, the metal nanocomposite includes a plurality of metal nanoparticles, and at least one of the metals in the metal nanoparticles is magnetic.

BRIEF DESCRIPTION OF THE DRAWINGS

The accompanying drawings illustrate one or more embodiments of the disclosure and, together with the written description, serve to explain the principles of the disclosure. The same reference numbers may be used throughout the drawings to refer to the same or like elements in embodiments.

DETAILED DESCRIPTION OF THE INVENTION

Figure 1:
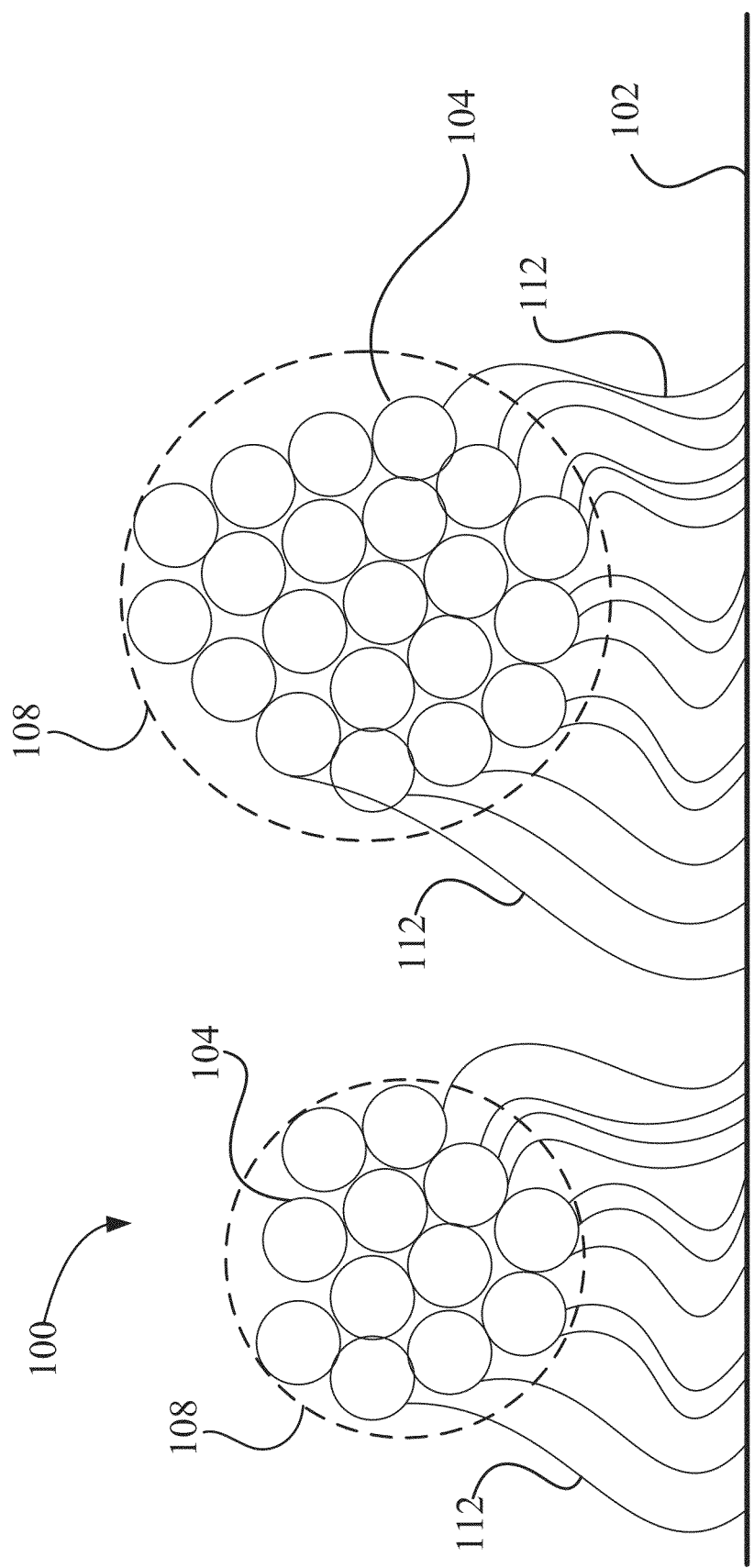
FIG. 1 illustrates metal nanocomposites according to certain embodiments of the present invention.

The present disclosure will now be described more fully hereinafter with reference to the accompanying drawings, in which exemplary embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. Like reference numerals refer to like elements throughout. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which has no influence on the scope of the disclosure. Additionally, some terms used in this specification are more specifically defined below.

Typically, terms such as "first", "second", "third", and the like are used for distinguishing various elements, members, regions, layers, and areas from others. Therefore, the terms such as "first", "second", "third", and the like do not limit the number of the elements, members, regions, layers, areas, or the like. Further, for example, the term "first" can be replaced with the term "second", "third", or the like.

Typically, terms such as "about," "approximately," "generally," "substantially," and the like unless otherwise indicated mean within 20 percent, preferably within 10 percent, preferably within 5 percent, and even more preferably within 3 percent of a given value or range. Numerical quantities given herein are approximate, meaning that the term "about," "approximately," "generally," or "substantially" can be inferred if not expressly stated.

Typically, "nanoscopic-scale," "nanoscopic," "nanometer-scale," "nanoscale," the "nano-" prefix, and the like refers to elements or articles having widths or diameters of less than about 1 μm, preferably less than about 100 nm in some cases. Specified widths can be smallest width (i.e. a width as specified where, at that location, the article can have a larger width in a different dimension), or largest width (i.e. where, at that location, the article's width is no wider than as specified, but can have a length that is greater), unless pointed out otherwise.

FIG. 1 schematically shows structures of nanocomposites 100 according to certain embodiments of the present disclosure. Typically, a nanocomposite 100 is a multiphase solid material where one of the phases has one, two or three dimensions of less than 100 nanometers (nm), or a structure having nano-scale repeat distances between the different phases that make up the material. In this example, the nanocomposite has nanoparticles 104 and a matrix carrier. For example, the nanoparticles can be embedded or dispersed in the surface 102 of the matrix carrier. The matrix carrier can be a carbon matrix from a renewable resource-based material. Further, multiple nanoparticles can form a cluster 108. Further, the nanoparticles can be metal nanoparticles. The metal of the metal nanoparticles can be in a reduced oxidation state including elemental state. Each of the metal nanoparticles can contain one or more molecules. In this example, each molecule can be $Fe_3O_4$, FeO, Fe, or $Fe_2O_3$. In certain embodiments, the molecules in each metal nanoparticle are substantially $Fe_3O_4$, and FeO. In certain embodiments, the nanoparticles are attached to the matrix carrier through one or more functional sites 112. For example, the matrix carrier can be formed from a renewable source-based material.

In certain embodiments, the metal nanocomposites can be produced by the following procedures.

(1) Initially a starting matrix material is prepared. The starting matrix material has at least one functional group (e.g. a hydroxyl group, an amino group, or a thiol group) that is capable of reacting with a quaternary amine compound (quat) to form functional sites. (2) The starting matrix material is treated with a quat to form a quat modified matrix material, which has at least one functional site. The functional sites can be formed from the reaction of the functional group of the starting matrix material and the quat. The functional sites from the quat are capable of chelating with metal ions. For example, a function site can be —O—$CH_2$—CH(OH)— from the quat. (3) The quat modified matrix material is treated with a metal salt to form a metal and quat treated matrix material, in which the metal ions are chelated with the functional sites. (4) The metal and quat treated matrix material is treated with an alkali to form an alkali, metal, and quat treated matrix material, which has a metal hydroxide component chelated to a functional site. The metal hydroxide component is transformed from the metal ion component chelated to the functional sites in the metal and quat treated matrix material. (5) The alkali, metal, and quat treated matrix material is heated through a predetermined heating process to form the metal nanocomposites. For example, the heating process can be microwave radiation at 700 watts for 3 to 5 minutes. The heating process can alternatively be a thermal process at 90° C. for 15 minutes.

In certain embodiments, a starting matrix material has at least one functional group that is capable of reacting with a quaternary amine compound (quat). The functional group, for example, can be a hydroxyl group (such as o-catechol present in tannin and lignin present in wood), an amino group, a thiol group, or other reactive groups. The functional group is capable of reacting with a quaternary amine compound (quat) under basic condition to form functional sites. The functional sites are capable of chelating with metal ions.

The starting matrix material can be a renewable resource-based material or synthetic materials. Some suitable matrix materials can be used as starting matrix material directly. Other suitable matrix materials can be treated to form the starting matrix materials. In certain embodiments, suitable matrix materials may include wood particles such as pine, cedar, oak, chestnut and cypress. In certain embodiments, suitable matrix materials may include tannins such as wood derivatives from a variety of sources including mimosa, chestnut, and quebracho. In certain embodiments, the matrix material is chosen from other inorganic or organic porous materials, such as cotton, silk, wool, linen, paper, other natural or synthetic fabrics (with either hydrophobic or hydrophilic properties), synthetic fibers, alumina, silica, zeolite, carbon black, activated carbon, graphite, carbon nanotubes, carbon nanodiamonds, high surface area carbon allotropes, and other materials with high porosity.

Some suitable matrix materials may already contain one or more functional groups, such as hydroxyl group (e.g., tannin, lignin or cellulose), amino group, thiol group, o-catechol (1,2-dihydroxybenzene) group, or other reactive group that is capable of reacting with quats. Thus, these matrix materials can be used directly as the starting matrix material. For example, materials such as softwood of pine, oak, chestnut, cypress, cedar, etc. in the form of chips, pellets or shavings typically themselves contain hydroxyl groups (e.g., tannins) in their structures. Further, additional functional groups can be added to the suitable matrix materials that already contain the desired functional groups to increase the density of functional groups in those matrix materials.

Some suitable matrix materials may not contain the desired functional groups. For example, matrix materials such as cotton, silk, linen, natural fibers, synthetic fibers or blends as well as other inorganic and organic porous materials, including alumina, silica, zeolite and high surface area carbon allotropes, typically do not contain the desired functional groups. But functional groups can be added to those matrix materials to form starting matrix materials.

In certain embodiments, starting matrix materials may contain low molecular weight compounds (, which, as will be described below, could impart color to water being purified by the nanocomposites). Treating the starting matrix materials with alkali can remove certain alkali soluble, low-molecular-weight compounds such as low molecular weight lignins and tannins from wood. For example, wood chips can be immersed in a 0.5 M NaOH solution.

The staring matrix material is then treated with a quaternary amine compound (quat) to form a quat modified matrix material, which includes functional sites formed by the reaction between the functional groups in the starting matrix material and the quat.

In certain embodiments, the quaternary amine compound can be a cationic agents, which includes one of (3-chloro-2-hydroxypropyl)trimethyl ammonium chloride (Quat 188, Dow®), 1,3-bis(trimethylammonium)-2-hydroxypropane dichloride, and glycidyl trimethyl ammonium chloride, or their combination. These inexpensive quaternary amine compounds are available on commercial scale. Other quaternary compound that can reacts with the functional groups in the matrix material and/or imparts positive charge to the quat modified matrix material can also be used. The positive charged group may be used to contract negative charged compounds as will be described in detail below.

In certain embodiments, the functional groups such as hydroxyl, amino, or thiol groups of the starting matrix material can be covalently anchored (bonded) to quaternary amine compound such as 3-chloro-2-hydroxypropyl trimethyl ammonium chloride, 1,3-bis(trimethylammonium)-2-hydroxypropane dichloride, glycidyl trimethyl ammonium chloride, or a combination of them. The quaternary amine compound reacts with and covalently modifies those functional groups and forms functional sites. The functional sites can include —O—CH2-CH(OH)—, —S—CH2-CH(OH)—, or —N(CH$_2$—CH(OH))$_2$—. The functional sites are capable of chelating with metal ions. Metal ions chelate more effectively and efficiently with the functional sites in the quat modified matrix material than with the functional groups (such as —OH) in the starting matrix material.

Formula 1 shows a reaction between a hydroxyl-containing starting matrix material and 3-chloro-2-hydroxypropyl trimethlammonium chloride (Quat 188) that forms a covalently modified material under the basic condition in presence of an alkali such as sodium hydroxide.

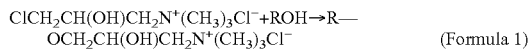
(Formula 1)

ROH represents the starting matrix materials that contain functional groups. The functional groups (e.g. —OH) are capable of reacting with a quaternary amine compound and forming a functional site (e.g. —O—CH$_2$—CH(OH)—).

In certain embodiments, the starting matrix material can be treated with a bis-quat (with reactive species on both ends with a positive charge in the middle) to increase the molecular weight of the oligomeric tannins. The bis-quat can serve as a cross-linking agent and bring the oligomeric units of the starting matrix material together in a covalent fashion. In addition, the functional sites, for example —O—CH$_2$—CH(OH)—, in the quat modified matrix material provide more spots for metal chelating comparing to hydroxyl groups, and hence improves the dispersion of the metal ions. These reactions may also covalently link the tannin to sugars or proteins in the matrix material, thereby preventing the tannin molecules from being washed away when using the final product of metal nanocomposites for applications such as water purification.

In certain embodiments, —OH functional groups of a starting matrix material can react with a predetermined reagent, such as a ClCH$_2$—CH(OH)—R to form —O—CH$_2$—CH(OH)— groups. The formed —O—CH$_2$—CH(OH)— groups then can chelate with metal ions.

In certain embodiments, a starting matrix material is treated by a reagent, for example a quat, such that a positive charged group is conveyed from the agent to the matrix material. The positive charged group may be used to attract negative charged compounds. For example, a starting matrix material containing —OH functional groups is treated with 3-chloro-2-hydroxypropyl trimethylammonium chloride, and forming a functional site of —O—CH$_2$—CH(OH)—CH$_2$N$^+$(CH$_3$)$_3$Cl$^-$, which contains a N$^+$ that has positive charge.

In certain embodiments, a solution of a metal salt can be added to the quat modified matrix material to form a metal and quat treated material, which has metal ions chelated with the functional sites. The quat modified matrix material serves as a more effective metal chelant, increases the amount of chelated metals, and improves the dispersion property of the chelated metals comparing with a non-quat modified matrix material. For example, Fe$^{3+}$ chelates with —O—CH$_2$—CH(OH)— in a quat modified matrix material more effectively than with —OH functional group. The high efficiency of the chelating of metal ions with the functional sites can be a result of various reasons. For example, metal ions can reach the functional site (such as —O—CH$_2$—CH(OH)—) more easily than reaching the functional groups (such as —OH) due to the length of the functional sites. Accordingly, a higher percentage of metal ions can chelate with the functional sites, comparing to chelating with the functional group. Further, a metal ion can chelate to, for example, the two oxygens in the —O—CH$_2$—CH(OH)— functional site, which is stronger than chelating to the one oxygen in the —OH functional group. In certain embodiments, not all the functional groups of the starting material are modified by quats and form the functional sites. Thus, some of the metal ions chelate with the functional sites and some chelate with the functional groups in the quat modified matrix material.

The metal salt solution may contain one or more of Fe$^{3+}$, Fe$^{2+}$, Ni$^{2+}$, Co$^{2+}$, Au$^{3+}$, Pt$^{2+}$, Pt$^{4+}$, Al$^{3+}$, Ti$^{4+}$, Ag$^+$, Pd$^{2+}$, Cu$^{2+}$, Cu$^+$, Mn$^{2+}$, Si$^{4+}$, Zr$^{+4}$, Sb$^{+2}$, Bi$^{3+}$, Zn$^{2+}$, Al$^{3+}$, W$^{6+}$, Ba$^{2+}$, Cr$^{3+}$, Sn$^{4+}$, Mo$^{6+}$, and other metal ions. Further, the metal salt solution may be a metal salt of chloride, acetate, nitrate, sulfate or other common salts. For example, the metal salt solution may be one of ferrous chloride, ferrous acetate, ferrous nitrate, ferrous sulfate, ferric chloride, ferric acetate, ferric nitrate, ferric sulfate, nickel chloride, nickel nitrate, nickel acetate, cobalt chloride, cobalt nitrate, and cobalt acetate.

Figure 2:
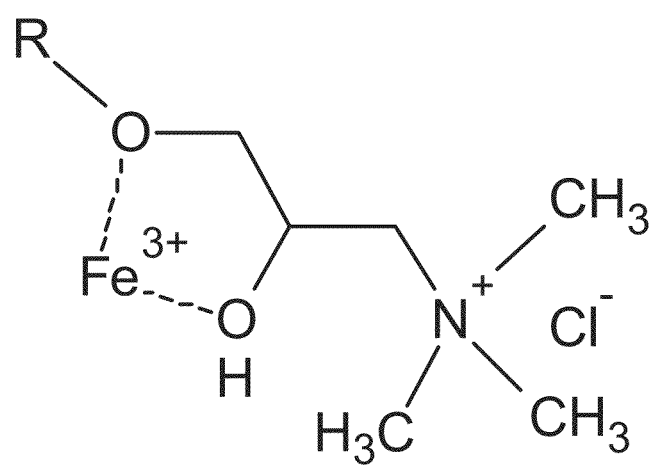
FIG. 2 schematically shows an iron ion chelated to a functional site of a quat modified matrix material according to certain embodiments of the present invention.

FIG. 2 schematically shows a structure of an iron ion chelated with a —O—CH$_2$—CH(OH)— functional site of a quat modified material in certain embodiments of the present disclosure. One skilled in the art would appreciate that other metal ions can be used in place of the iron ion, and other functional sites can be used in place of —O—CH$_2$—CH(OH)—.

In certain embodiments, the starting matrix materials with functional groups can be treated with quat before being treated with metal ions. Alternatively, the starting matrix material with functional groups can be treated with quat and metal ions together or at the same time.

In certain embodiments, the metal and quat treated matrix material can be further treated with an alkali to transform the metal ion component in the material to a metal hydroxide component. Alternatively, the metal ion treatment of the matrix material and alkali treatment of the matrix material can be applied together or at the same time. In certain embodiments, the alkali can be an alkali solution contains at least one of sodium hydroxide and ammonium hydroxide. Alternatively, the alkali can be an ammonia gas. Metal salt is added and the metal ions chelated with the functional sites of the quat modified matrix material. Addition of an alkali such as sodium, potassium or ammonium hydroxide then may result in the conversion of chelated metal ion component to metal hydroxide component.

Figure 3:
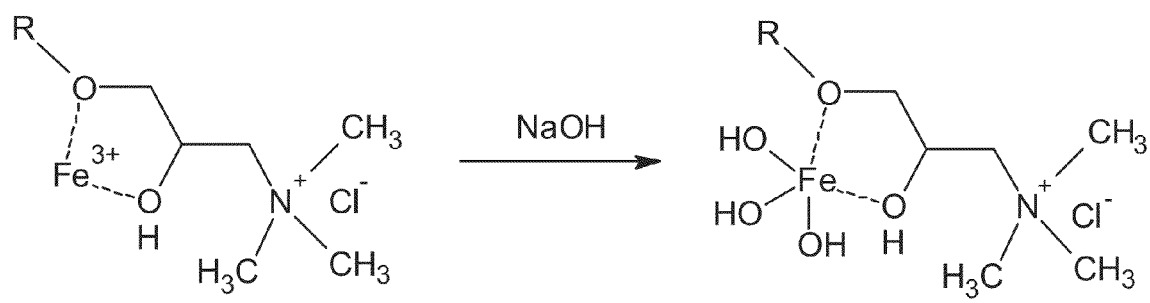
FIG. 3 schematically shows transformation of an iron ion component to an iron hydroxide component when the iron ion chelated to the functional site is treated with sodium hydroxide according to certain embodiments of the present invention.

FIG. 3 schematically shows a conversion of metal ion component in the metal chelated quat modified matrix material to metal hydroxide component under the treatment of alkali in accordance with certain embodiment of the present disclosure. Addition of an alkali base such as ammonium or sodium hydroxide causes the transformation of the iron ion component ($Fe^{3+}$) to iron hydroxide component ($Fe(OH)_3$).

In certain embodiments, the alkali, metal and quat treated material can be heated using various techniques to produce quat-carbon metal composites (i.e., metal particles impregnated in the quat modified matrix) or the metal nanocomposites having metal nanoparticles embedded or dispersed in a matrix carrier. For example, the alkali, metal and quat treated material can be subject to microwave radiation at a power such as in the range of 700 W to 1.2 KW and for a predetermined period of time such as in the range of about 1-30 minutes, 2-20 minutes, 3-10 minutes, or 3-5 minutes, such that the heating of the alkali, metal and quat treated material is effective to produce the metal nanocomposite.

Alternatively, the reduction reaction may take place under fast heating techniques other than microwave radiation. In certain embodiments, the alkali, metal and quat treated matrix material may be heated by using conventional, non-microwave techniques at a predetermined temperature (e.g., about 60-100° C., 70-90° C., or 80° C.) for a period of time (e.g. about 5-120 minutes, 10-60 minutes, or 15-40 minutes) to produce the metal nanocomposites. Again, the nanocomposites have metal nanoparticles embedded or dispersed in a matrix carrier. In certain embodiments, the heating process can also be carried out in any conventional oven that provides radioactive heating. Both laboratory and home convection ovens can be well suited for the purpose of rapid conversion.

Microwave treatment of the alkali, metal and quat treated matrix material can also result in the reduction of iron ion, e.g., reduction of $Fe^{3+}$ to $Fe^{2+}$ or elemental Fe. For example, the hydrated iron oxide $Fe_2O_3.H_2O$ (iron hydroxide) can be reduced to magnetite ($Fe_3O_4$). In certain embodiments, the produced metal nanocomposite may include metal oxide, reduced metal oxide, or mixed metal oxide. In certain embodiments, the produced metal nanocomposite may include elemental Fe. In certain embodiment, the reduced metal oxide is magnetic.

Figure 4:
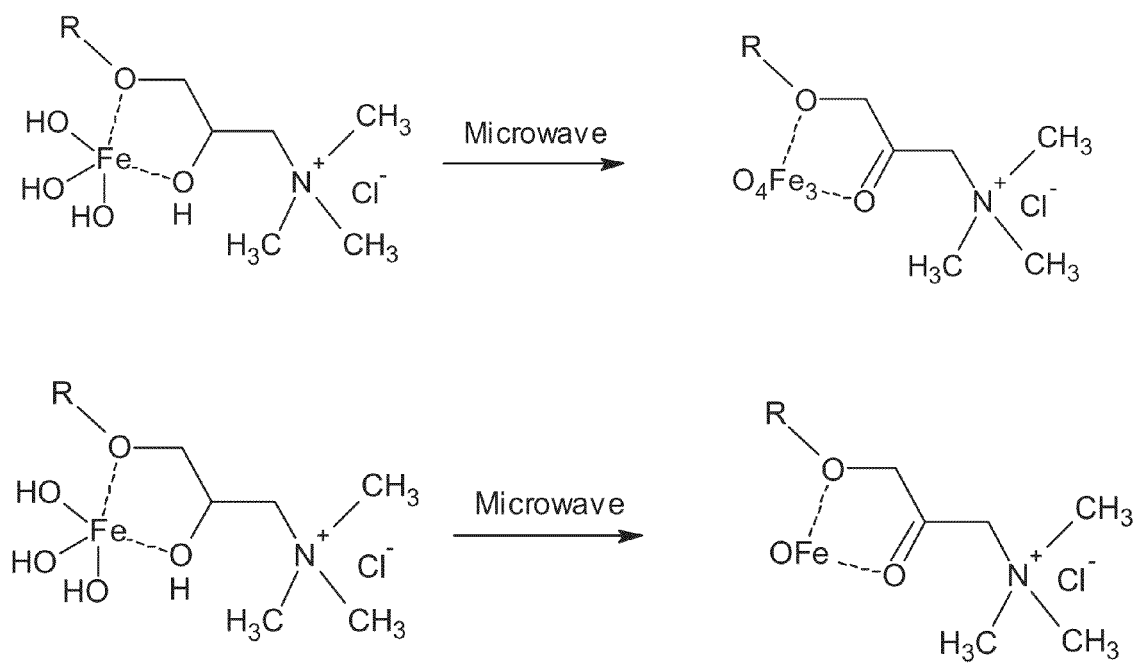
FIG. 4 schematically shows transformation of the iron hydroxide component to reduced iron oxide components when the iron hydroxide chelated to the functional site is subjected to microwave radiation according to certain embodiments of the present invention.

FIG. 4 schematically shows two reactions that reduce iron hydroxide component to reduced iron oxides component. Before the microwaving treatment, the iron is in a form of iron hydroxide ($Fe(OH)_3$) component chelated with the functional site, for example, —O—$CH_2$—CH(OH)—, of the matrix material. After the microwaving treatment, the iron is in a form of $Fe_3O_4$ or FeO components chelated with the functional sites.

The reduction of metal ions can be promoted by other hydroxyl-containing groups present in the starting matrix materials (e.g., o-catechol present in tannin and lignin present in wood). For example, microwaving the matrix material of lignin can produce CO, $CH_4$, $CO_2$ and $H_2$. The produced $H_2$, CO or $CH_4$ can function as reducing agents to reduce the metal ions. In certain embodiments, the starting matrix materials may contain o-catechol as reducing agent. Alternatively, the starting matrix materials may include other groups that functional as reducing agent. In certain embodiments, the starting matrix material is pretreated such that the starting matrix material contains o-catechol or other groups that can function as reducing agents.

In certain embodiments, the carbon (either from the starting matrix material or the quats) in the produced metal nanocomposites is not in the form of pure carbon atoms, but exists predominantly as carbon containing compounds. Under certain circumstances, the metal nanocomposites may not be completely carbonized.

Although the above example may show an order for executing the processes, one skilled in the art will recognize that in some other embodiments the order of the processes can be changed. For example, the matrix material can be treated with the metal ions and alkali together or at the same time. The matrix material can be treated with alkali prior to being treated with metal.

Figure 5:
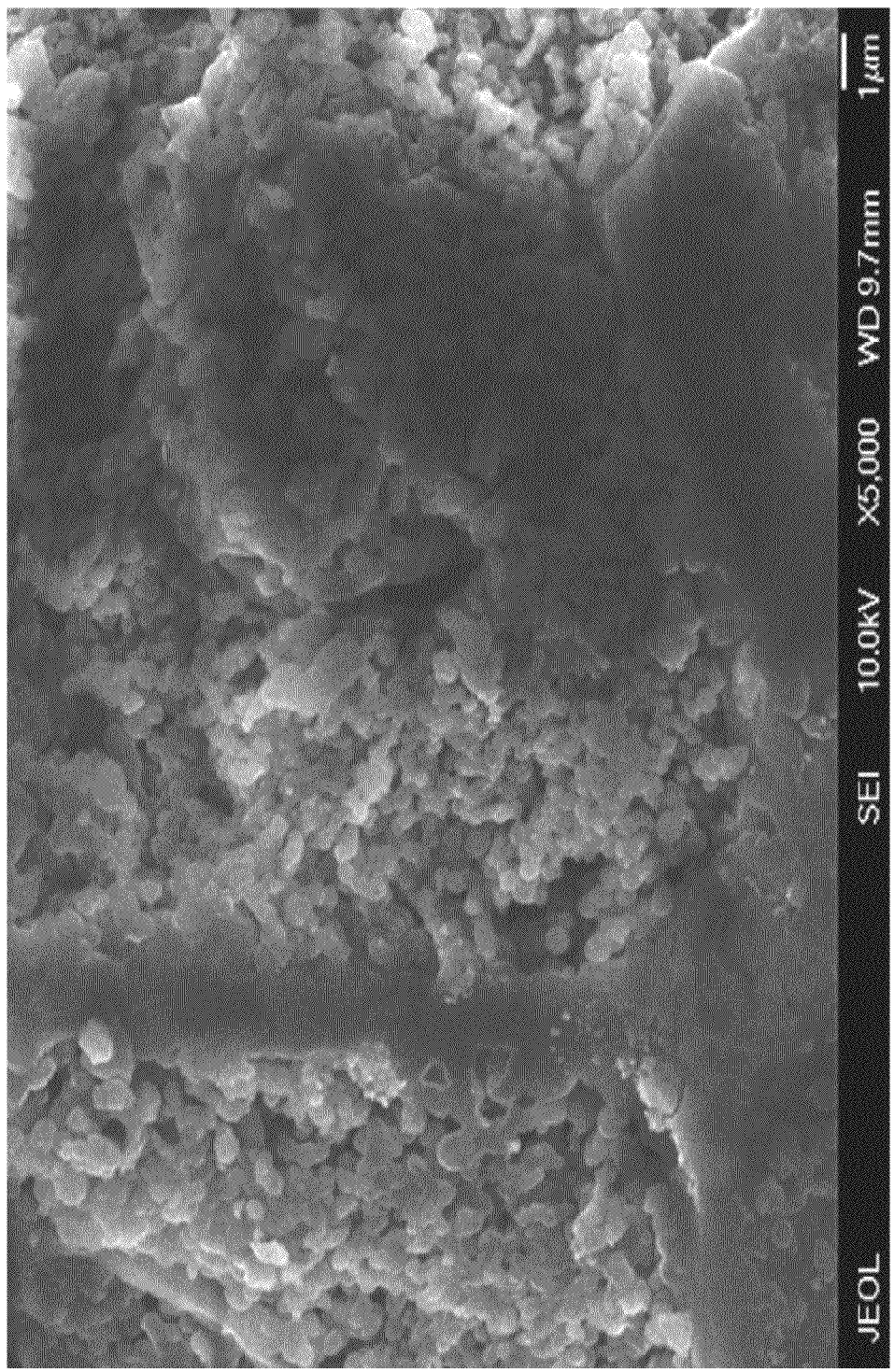
FIG. 5 schematically shows a Scanning Electron Microscopy image of metal composites according to certain embodiments of the present disclosure.

FIG. 5 shows a Scanning Electron Microscopy image of the reduced metal oxide particles impregnated in a quat modified matrix produced in accordance with certain embodiments of the present disclosure. The reduced metal oxide particles are submicron in size and dispersed quite evenly throughout the matrix. The matrix is the surface of the wood.

In certain embodiments, the size of the metal particles can vary from nano to submicron to micron depending on the concentration of metal salt (iron chloride here) used during the synthetic process. If the particles are made from metal salts in the presence of sodium chloride then the particle size could be in the nano ($10^{-9}$ m) range and be even more dispersed since the salt molecules can act as spacers. The sodium chloride can be washed off after reduction of the metal oxide leaving behind reduced metal oxides in the nanodimension.

In certain embodiments, the reduced metal oxide particles (including magnetite particles) are formed on the porous wood surface. The particles could be attached to the hydroxyl groups on the surface of the wood. These hydroxyls may originate from lignin, sugars or tannins in wood. The reduction chemistry in the presence of wood may involve o-catechol units present in lignin or tannin in wood. Sugars may not be capable of doing reduction chemistry in the temperature range used in this method. In certain embodiments, the conversion of iron oxide to magnetite takes place on the surface of the wood.

Figure 6:
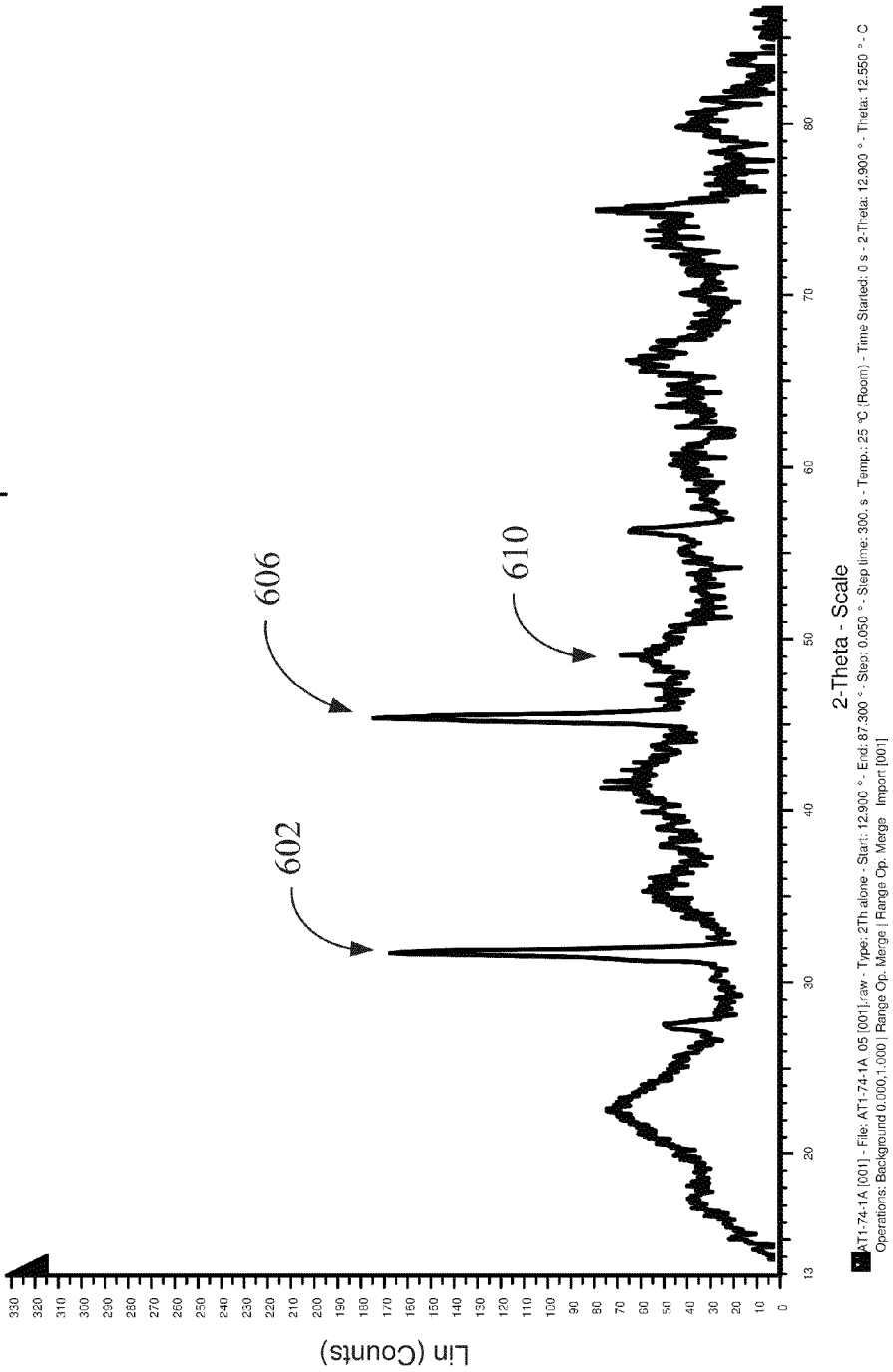
FIG. 6 schematically shows an X-ray diffraction spectrum of the metal composites according to certain embodiments of the present disclosure.

In certain embodiments, different forms of metal and metal oxo nanoparticles can be distinguished, because they have different and distinct X-ray diffraction (XRD) patterns. They may also be distinguishable by their different magnetic properties. FIG. 6 is the X-Ray diffraction of the quat-carbon metal composites (with some magnetite). FIG. 6 shows that magnetite (or maghemite) is present in the quat-carbon metal composites along with Fe. Maghemite is generally obtained at very high temperatures and hence the identity of the particles prepared in certain embodiments at less than 150° C. is magnetite. The peak 602 at 31.5° arises from the magnetite along with associated peaks at 42°, 56° and 61°. The peak 606 around 45° corresponds to Fe with associated peak at 66°. The peak 610 at 49° corresponds to $Fe_2O_3$. Other peaks associated with $Fe_2O_3$ are obscured due to noise. Additional peaks seen in the XRD spectrum are due to other forms of iron oxides including FeO. The broad peak at around 23° is due to wood. The magnetism of the final product can be proved by the attraction of the product to a strong bar magnet. Also the final material is rubbery due to quat-modification.

The metal nanocomposites produced according to certain embodiments of the present disclosure can be used in water purification. The metal nanocomposites can be cheap and non-toxic, can be manufactured in different forms (e.g., powders or grains with different diameters) and shapes (flakes, pellets etc.), and can have magnetic properties. Thus, the produced metal nanocomposites are suitable for water purification, such as removing phosphorus, arsenic and selenium from contaminated water, where the phosphorus, arsenic and selenium may be presented in water soluble oxide forms. For example, the metal nanocomposites contain positive charges on the nitrogen of the quat, which can improve the rate of phosphate adsorption. Further, the reduced metal oxide can be magnetic. Thus, the metal nanocomposites may be selectively removed or held in place through magnetic means.

In certain embodiments, the process of water purification involves bringing the phosphate (or arsenate or selenate or other metaloxo species) in contact with the purification media. The modification of wood using quaternary ammonium salt makes the wood surface positively charged which serves to attract the negatively charged metaloxo anions. The magnetite particles form a complex with the metaloxo anions and serve to separate it from the water that originally contaminated it. The formation of the complex is a chemical adsorption phenomenon.

In certain embodiments, various procedures that bring the phosphate-contaminated water in contact with the adsorption media, which include the metal nanocomposites, can remove phosphate. For example, the procedures may use porous bags containing the adsorption media, a cartridge containing the media, or a column containing the media, through which water can be introduced either sideways or from the top or bottom (percolation). The media could be mixed with other agents that work in concert with the adsorption media.

In certain embodiments, it could also be a process of simply mixing the media containing the metal nanocomposite with the contaminated water and stirring the mixture either using a mechanical stirrer or through agitation. Following adequate contact time, the media can be separated using conventional means (filtration) or be accomplished using magnets (electromagnets) strong enough to attract the magnetic composite media.

In certain embodiments, granulated powders containing the metal nanocomposites are used in the water purification process. The granulated powder may be incorporated in a device such as a filter cartridge and the contaminated water can be re-circulated several times through the filter cartridge (such as in an aquarium). Alternatively, the granulated powder may be used in a column (with or without a separation aid, e.g. sand). Following adequate contact time the media can be separated using conventional means (filtration) or it could be accomplished using strong magnets (electromagnets) strong enough to attract the magnetic composite media. In case of column use there is no need for another step for separation of the media.

Following removal of the phosphate (or other oxo species) and separation of the media from the water, the media can be treated with a dilute alkali such as 1% ammonium or sodium hydroxide to remove the adsorbed phosphate (or other oxo species). The oxo species will be displaced by the hydroxide ions supplied by the alkali. The washed solution that contains phosphate can be used as a source of fertilizer. The hydroxide containing media can then be washed with water (or $CO_2$ spurged water) to obtain a neutralized, regenerated media. This regenerated media could then be used again for water purification.

It is also desirable to produce high surface area well dispersed metal nanoparticles according to embodiments of the present disclosure to remove toxic metals from contaminated environments. It is also desirable to produce a media according to embodiments of the present disclosure to increase rate of heavy metal removal, i.e. quickly removal of the toxic metals. The material may also be configured to remove toxic and odorous contaminants in air such as sulfur containing compounds.

Aspects of the present teaching may be further understood in light of the following examples, which should not be construed as limiting the scope of the present teachings in any way.

Example 1

Figure 7:
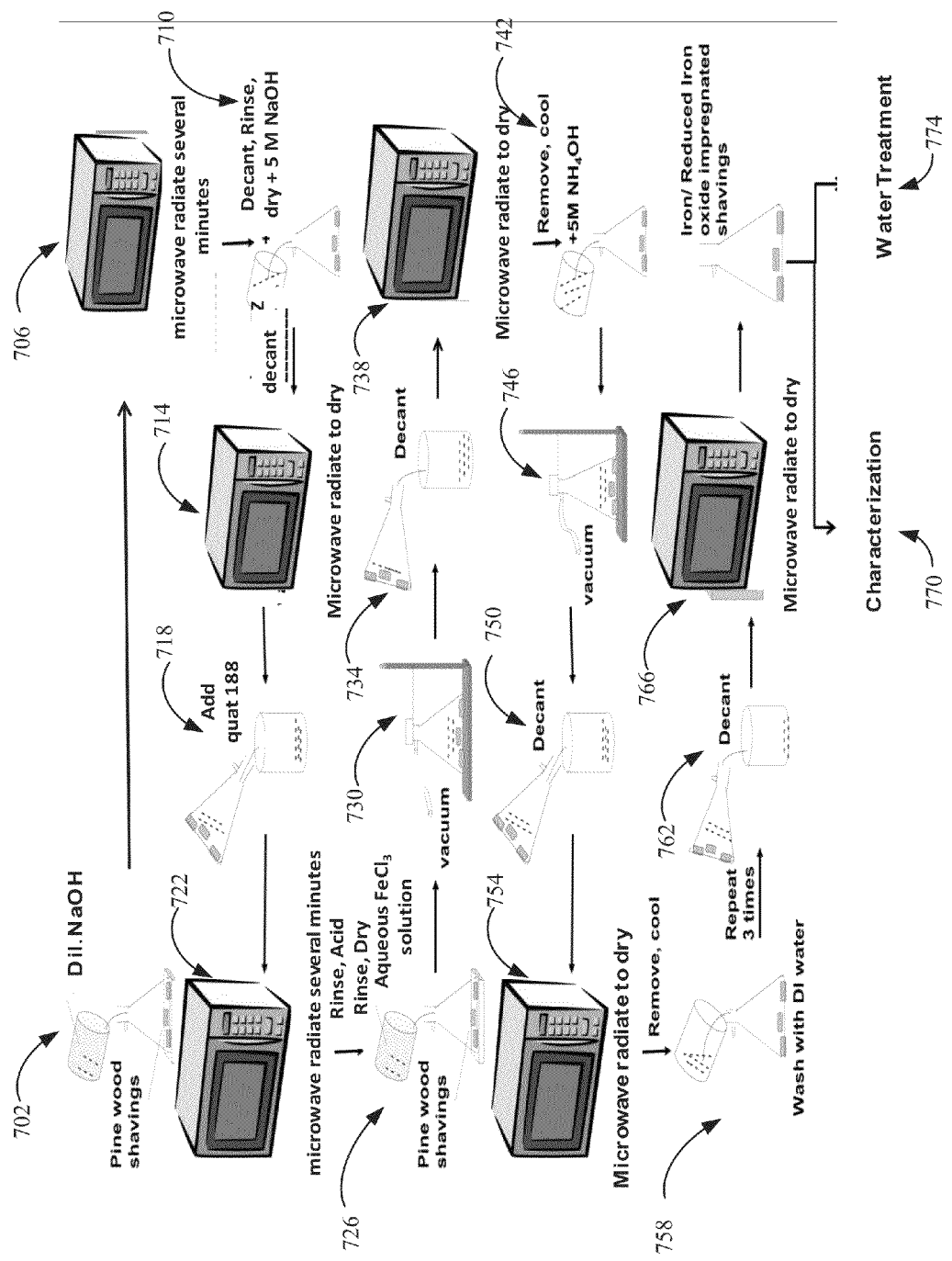
FIG. 7 schematically shows procedures for producing metal nanocomposites using quat modified matrix material according to certain embodiments of the present disclosure.
Figure 8:
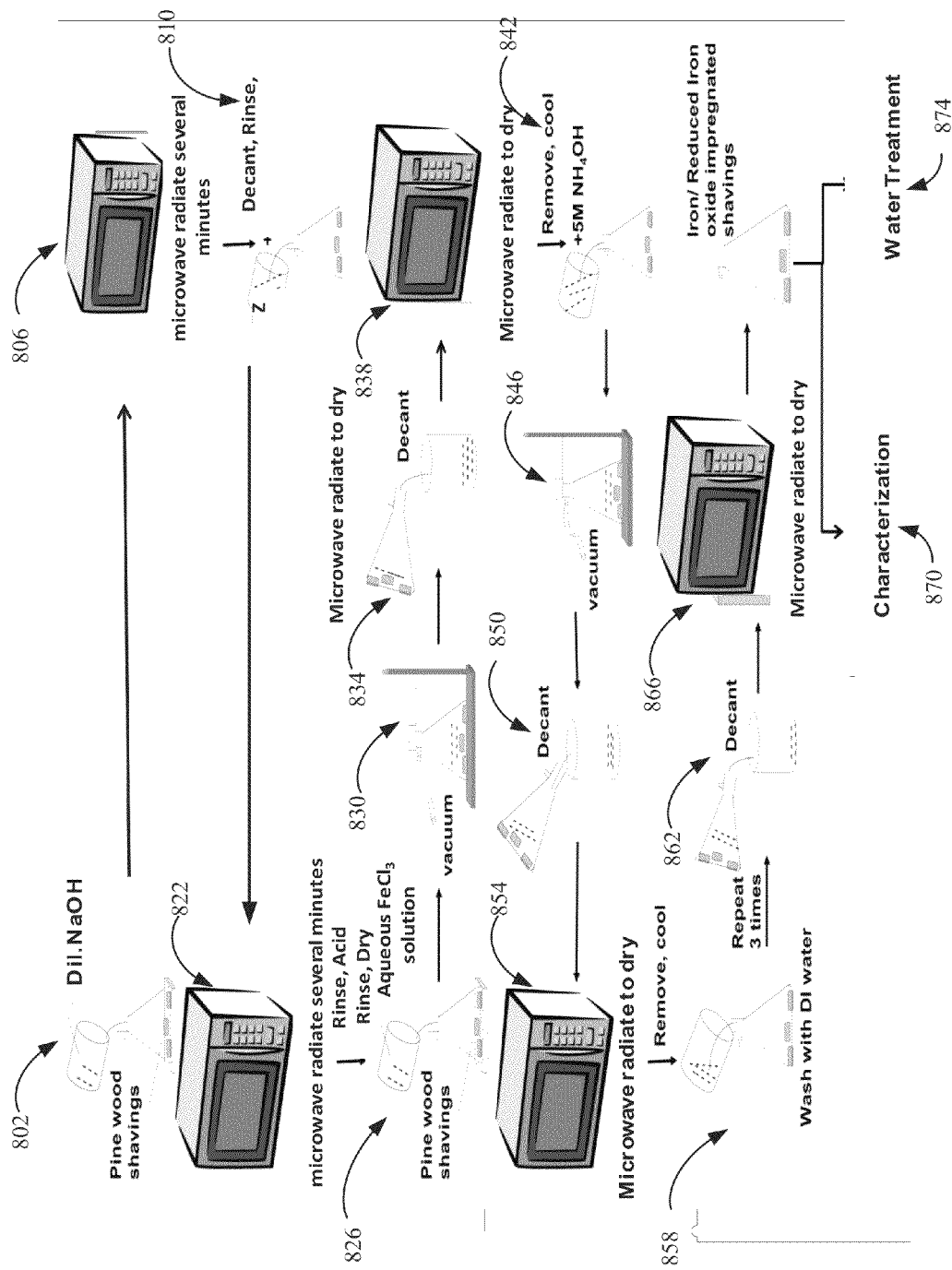
FIG. 8 schematically shows procedures for producing metal nanocomposites using non-quat modified matrix material according to certain embodiments of the present disclosure.

Preparation of Quat Modified Matrix Material Based Iron Nanocomposites from Pine Shavings The following is an example of preparing quat modified matrix material based metal nanocomposites according to one embodiment of the present disclosure. As shown in FIG. 7, the nanocomposites were prepared by a series of soaking, microwaving, and rinsing.

A starting matrix material is prepared. The product of this example may be used in water purification. However, presence of low molecular weight soluble compounds in a matrix material, for example, wood shavings, could impart significant coloration and contamination of the water being purified. Accordingly, these low molecular weight compounds need to be removed. An alkali treatment will result in dissolution of these low molecular weight lignins and tannins that must be washed away prior to modification of the wood. Non alkali-extractable lignins and tannins would stay behind and come in play for the reduction chemistry discussed above.

Accordingly, in operation 702, 4 g of pine wood shavings (or wood chips) that were both of good size and durability were measured out into a clean, dry beaker. 250 mL of 0.5 M NaOH solution was added to the wood shavings. In operation 706, the wood shavings immersed in the NaOH solution were microwaved for 10 minutes at 1 minute interval. The NaOH solution was decanted and the wood chips were rinsed several times. The wood shavings were then microwaved for 6 minutes at 30 second intervals whereupon the material appears dry.

In operation 710, the wood chips were immersed in 5 M NaOH solution until the entire material seem covered, and keep at room temperature for 30 minutes. The NaOH was decanted. In operation 714, the treated wood shavings were microwaved for 3 minutes at 1 minute interval until dry. In operation 718, 75 mL of 4 M (3-chloro-2-hydroxypropyl) trimethyl ammonium chloride was added to the dry wood shavings. In operation 722, the treated wood shavings were microwaved for 10 minutes at 30 second intervals. The wood shavings were then rinsed several times with deionized water and once with 100 mL of 0.01 M HCl. After that, the wood shavings were further rinsed several more times with deionized water and microwaved for 3 minutes at 1 minute interval to dry. By the treatment, the wood shavings were quaternized and positive charges were added.

In operation 726, a 1 M $FeCl_3$ solution was prepared by dissolving 13.52 g of $FeCl_3$ in 50 mL of deionized water in a 50 mL graduated cylinder. Sonication may be needed to dissolve $FeCl_3$. Then 4 grams of the quaternized wood shavings were placed in a vacuum flask. The 50 mL solution of $FeCl_3$ was poured into the flask with the pine wood shavings. In operation 730, a vacuum was applied to the vacuum flask to remove all air from the porous wood shavings to allow for the iron solution to fill all cavities. The solution was allowed to sit for 2 hours to allow the maximum amount of iron to be adsorbed onto the wood shavings. After 2 hours, in operation 734, the vacuum was removed and the $FeCl_3$ solution was decanted. In operation 738, the wood shavings were placed in a microwave for 2 minutes at 15 second intervals until the wood shavings were dry.

In operation 742, the wood shavings then were immersed in a 5 M NH$_4$OH solution inside the vacuum flask. In operation 746, for the first hour, suction was applied to create a vacuum and allow the air to be removed from the pores and for the ammonium hydroxide to be allowed into the pores. After one hour, the suction was removed and the wood shavings were allowed to sit for 24 hours. In operation 750, after the 24 hour of soak, the NH$_4$OH was decanted. In operation 754, the wood chips were microwaved for 3 minutes at 1 minute interval until dry. In operation 758, the wood chips were then rinsed several times with deionized water to remove the NH$_4$Cl from the wood shavings.

In operation 762, the solution was decanted and in operation 766, the wood shavings were treated with microwaving for 4 minutes at 30 second intervals to form the product of iron nanocomposite.

Further, in operation 770, the product was tested for magnetism by using a strong bar magnet or characterized by x-ray diffraction or Scanning Electron Microscopy.

Moreover, in operation 774, the produced iron nanocomposite was used for water treatment.

The produced iron nanocomposite (either in presence or absence of alkali) is an insoluble material that may appear as a black material and could have applications in a variety of fields that require metal particle dispersions in the solid state.

Example 2

Preparation of Comparative Non-Quat Modified Matrix Material Based Ion Nanocomposites from Pine Shavings A comparative non-quat modified matrix material based ion nanocomposites were produced for comparison with the quarternized carbon-iron nano composites.

In this comparative example, in operation 802, 4 g of pine wood shavings (or wood chips) that were both of good size and durability were measured out into a clean, dry beaker. 250 mL of 0.5 M NaOH solution was added to the wood shavings. In operation 806, the wood shavings immersed in the NaOH solution were microwaved for 10 minutes at 1 minute interval.

In operation 810, the NaOH solution was decanted and the wood chips were rinsed several times. In operation 822, the wood shavings were then microwaved for 6 minutes at 30 second intervals whereupon the material appears dry.

In operation 826, a 1 M FeCl$_3$ solution was prepared by dissolving 13.52 g of FeCl$_3$ in 50 mL of deionized water in a 50 mL graduated cylinder, sonication may be needed to dissolve FeCl$_3$. Then 4 grams of the quaternized wood shavings were placed in a vacuum flask. The 50 mL solution of FeCl$_3$ was poured into the flask with the pine wood shavings. In operation 830, a vacuum was applied to the vacuum flask to remove all air from the porous wood shavings to allow for the iron solution to fill all cavities. The solution was allowed to sit for 2 hours to allow the maximum amount of iron to be adsorbed onto the wood shavings. After 2 hours, in operation 834, the vacuum was removed and the FeCl$_3$ solution was decanted. In operation 838, the wood shavings were placed in a microwave for 2 minutes at 15 second intervals until the wood shavings were dry.

In operation 842, the wood shavings then were immersed in a 5 M NH$_4$OH solution inside the vacuum flask. In operation 846, for the first hour, suction was applied to create a vacuum and allow the air to be removed from the pores and for the ammonium hydroxide to be allowed into the pores. After one hour, the suction was removed and the wood shavings were allowed to sit for 24 hours. After the 24 hour soak, in operation 850, the NH$_4$OH was decanted. In operation 854, the wood chips were microwaved for 3 minutes at 1 minute interval until dry. In operation 858, the wood chips were then rinsed several times with deionized water to remove the NH$_4$Cl from the wood shavings. In operation 862, the solution was decanted.

In operation 866, the wood shavings were treated with microwaving for 4 minutes at 30 second intervals to form non-quaternized carbon-iron nanocomposite.

Further, in operation 870, the product was tested for magnetism by using a strong bar magnet or characterized by x-ray diffraction or Scanning Electron Microscopy.

Moreover, in operation 874, the produced iron nanocomposite was used for water treatment.

Example 3

Comparison of Quat Modified Matrix Material Based Iron Nanocomposites and Non-Quat Matrix Material Based Ion Nanocomposites Iron nanocomposites made by impregnating metal in a quat modified matrix material are effective in the removal of arsenic, phosphorus and selenium from contaminated water. In this example, the effectiveness of the iron nanocomposites produced from Example 1 and the iron nanocomposites produced from Example 2 for removing phosphorus from contaminated water are compared.

In this Example, 300 mg of iron nanocomposites based on quat-modified matrix material and non-quat modified matrix material were added to a pH 7 aqueous solution containing 100 mg phosphate (P) per liter. As shown in Table 1, the adsorption capacity of iron nanocomposites based on non-quat-modified matrix material is 3.7 and 8.0 mg P/g composite at 24 and 48 hours, respectively. In comparison, the adsorption capacity of iron nanocomposites based on quat-modified matrix material is 17.55 and 23.46 mg P/g composite at 24 and 48 hours, respectively. The iron nanocomposites based on quat-modified matrix material are significantly more efficient in terms of the capacity for P removal from contaminated water than the iron nanocomposites based on quat-modified matrix material.

TABLE 1

Comparison of Adsorption Capacities (mg P/g composite)

| | 24 hr treatment | 48 hr treatment |
| --- | --- | --- |
| Non-quaternized iron nanocomposite | 3.7 | 8.0 |
| Quaternized iron nanocomposite | 17.55 | 23.46 |

Figure 9:
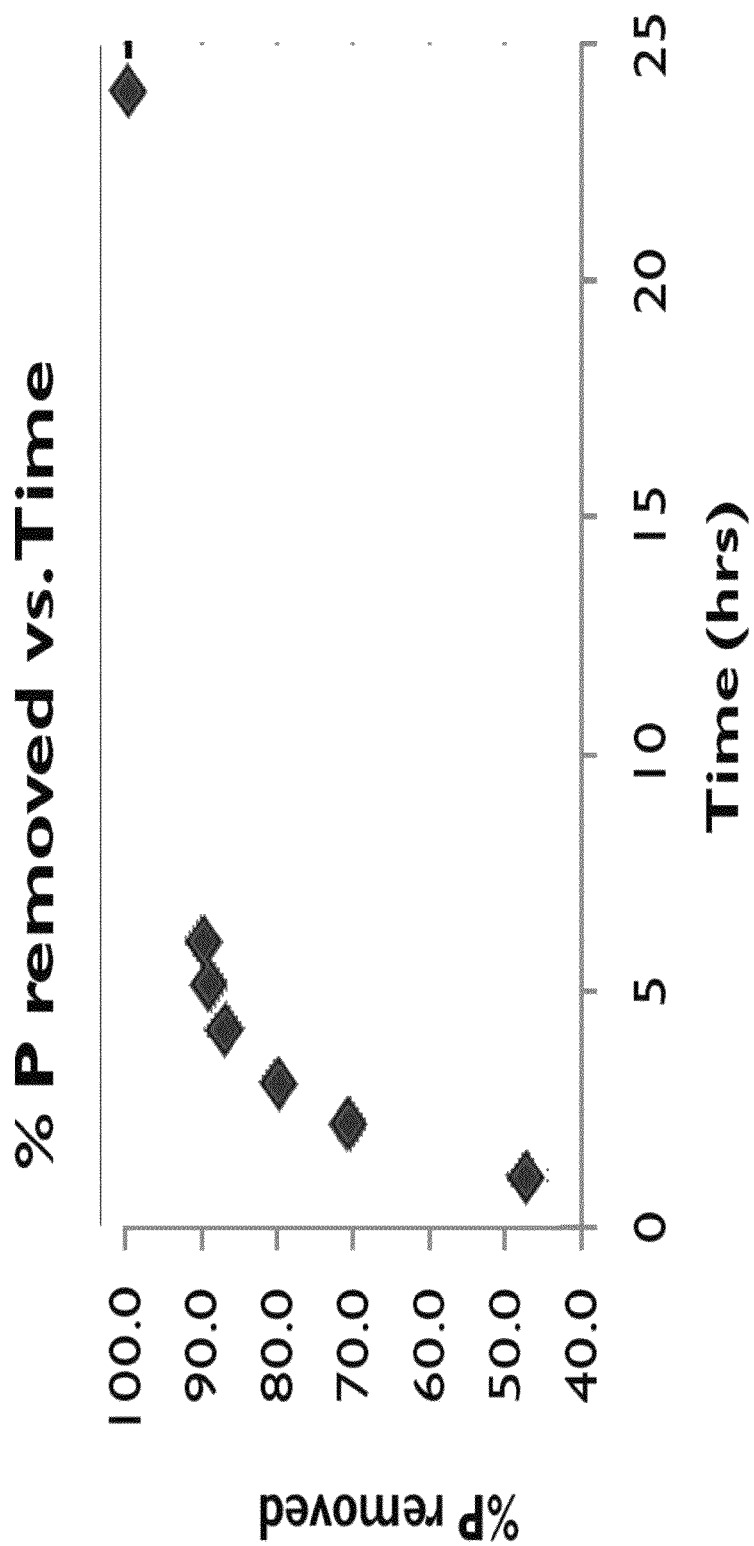
FIG. 9 shows kinetic data of phosphate adsorption of quaternized carbon-iron nanocomposite.

Further, FIG. 9 shows that the iron nanocomposites based on quat-modified matrix material prepared in Example 1 have a rapid rate of P removal from contaminated water. In this experiment, 300 mg of iron nanocomposites based on quat-modified matrix material were added to a pH 7 aqueous solution containing 100 mg phosphate (P) per liter. As shown in FIG. 9, the percentage of phosphate removal at 1, 2, 3, 4, 5 and 6 hours are about 46%, 70%, 80%, 88%, 89% and 90%, respectively. After 25 hours, about 98% percent of phosphate is removed from the contaminated water. Thus, the iron nanocomposites based on quat-modified matrix material shows efficient phosphate removal in the first 4-6 hours.

Figure 10:
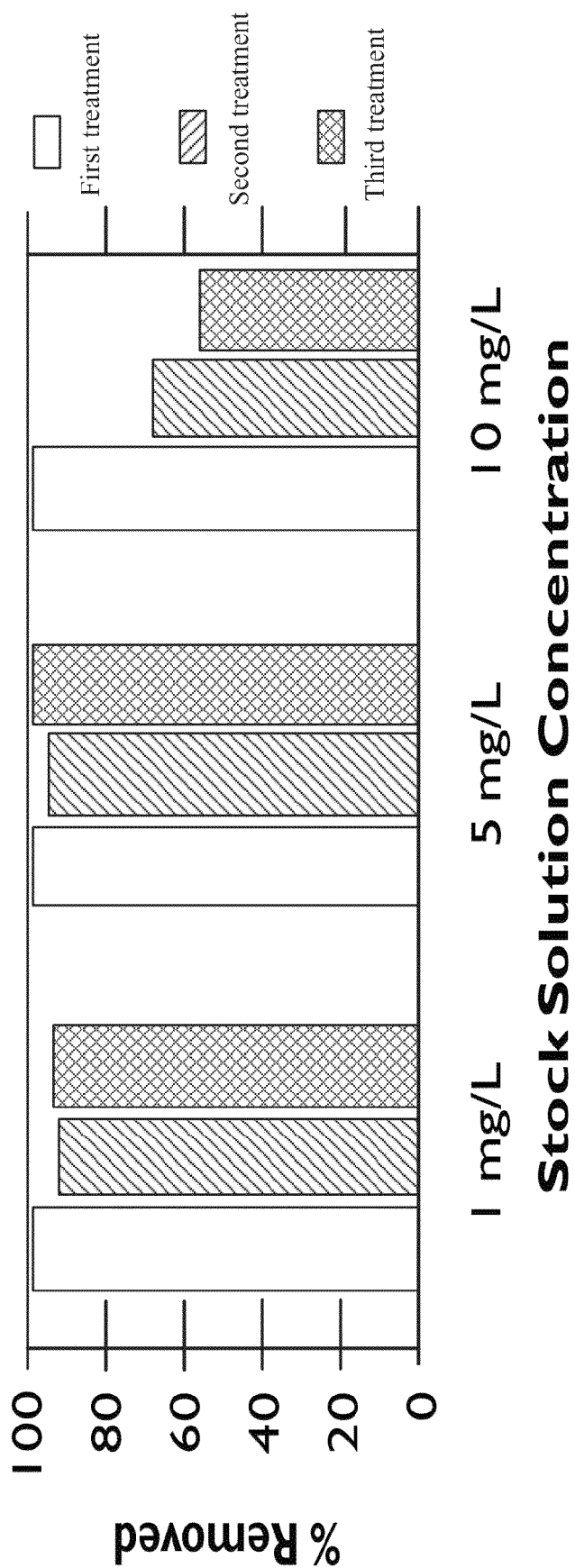
FIG. 10 shows regeneration data of phosphate adsorption of quaternized carbon-iron nanocomposite.

FIG. 10 shows the regeneration of the iron nanocomposites produced based on quat-modified matrix material according to the present disclosure when used for phosphate removal. In the first treatment, three sets of 300 mg iron nanocomposites based on quat-modified matrix material were added to three pH 7 aqueous solutions containing 1 mg, 5 mg and 10 mg phosphate (P) per liter respectively, and the contaminated water was treated for 48 hours. The percentage of phosphate removal is about 100% for all three samples. After the first treatment, the three sets of iron nanocomposites were recycled and regenerated by adding 0.1M NaOH to the iron nanocomposites and stirring respectively. The 0.1M NaOH was decanted and the medium were rinsed by water until the pH of the washings turned neutral. The three sets of iron nanocomposite were used again for the second treatment to remove phosphate under the same conditions as the first treatment. The percentage of phosphate removal is about 90%, 92% and 68% for the 1 mg, 5 mg and 10 mg phosphate (P) per liter contaminated water samples. The iron nanocomposites used above were then regenerated. The regenerated iron nanocomposites were then used for the third treatment to remove phosphate under the same conditions as the first treatment. The percentage of phosphate removal is about 92%, 98% and 58% for the 1 mg, 5 mg and 10 mg phosphate (P) per liter contaminated water samples.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

Further, one or more embodiments of the present disclosure are directed to one or more of the following items:

A. A composite prepared by the thermal or microwave treatment of a base (sodium, calcium, ammonium hydroxide or ammonia gas) treated, metal complexed, and 3-chloro-2-hydroxypropyl trimethylammonium chloride (cationic reagent) and/or 1,3-bis(trimethylammonium)-2-hydroxypropane dichloride bonded material.

B. A composite prepared by the thermal or microwave treatment of a base (sodium, calcium, ammonium hydroxide or ammonia gas) treated, metal complexed, and 3-chloro-2-hydroxypropyl trimethylammonium chloride (cationic reagent) and/or 1,3-bis(trimethylammonium)-2-hydroxypropane dichloride bonded material where the bonded material is wood, cellulose, chitin, lignin, tannin, silk, protein, wool, chitosan or their derivatives.

C. A composite prepared by the thermal or microwave treatment of a base (sodium, calcium, ammonium hydroxide or ammonia gas) treated, metal complexed, and 3-chloro-2-hydroxypropyl trimethylammonium chloride (cationic reagent) and/or 1,3-bis(trimethylammonium)-2-hydroxypropane dichloride bonded material where the bonded material is to a material containing an o-catechol unit such as tannin.

D. A composite prepared by the thermal or microwave treatment of a base (sodium, calcium, ammonium hydroxide or ammonia gas) treated, metal complexed, and 3-chloro-2-hydroxypropyl trimethylammonium chloride (cationic reagent) and/or 1,3-bis(trimethylammonium)-2-hydroxypropane dichloride bonded material where the metal is $Fe^{3+}$, $Fe^{2+}$, $Ni^{2+}$, $Co^{2+}$, $Au^{3+}$, $Pt^{2+}$, $Pt^{4+}$, $Al^{3+}$, $Ti^{4+}$, $Ag^+$, $Pd^{2+}$, $Cu^{2+}$, $Cu^+$, $Mn^{2+}$, $Si^{4+}$, $Zr^{+4}$, $Sb^{+2}$, $Bi^{3+}$, $Zn^{2+}$, $Al^{3+}$, $W^{6+}$, $Ba^{2+}$, $Cr^{3+}$, $Sn^{4+}$, $Mo^{6+}$.

E. A composite prepared by the thermal or microwave treatment of a base (sodium, calcium, ammonium hydroxide or ammonia gas) treated, metal complexed, and 3-chloro-2-hydroxypropyl trimethylammonium chloride (cationic reagent) and/or 1,3-bis(trimethylammonium)-2-hydroxypropane dichloride bonded material where the bonded material is to a material containing an o-catechol unit such as tannin present in a matrix including wood (pine, cedar, oak, chestnut and cypress) and paper.

F. A composite prepared by the thermal or microwave treatment of a base (sodium, calcium, ammonium hydroxide or ammonia gas) treated, metal complexed, and 3-chloro-2-hydroxypropyl trimethylammonium chloride (cationic reagent) and/or 1,3-bis(trimethylammonium)-2-hydroxypropane dichloride bonded material where the bonded material is to a material containing an o-catechol unit such as tannin present in a matrix including cotton, linen, silk, wool and other natural, synthetic and blended fabrics.

G. A composite prepared by the thermal or microwave treatment of a base (sodium, calcium, ammonium hydroxide or ammonia gas) treated, metal complexed, and 3-chloro-2-hydroxypropyl trimethylammonium chloride (cationic reagent) and/or 1,3-bis(trimethylammonium)-2-hydroxypropane dichloride bonded material where the bonded material is to a material bonded to o-catechol unit such as tannin present in a matrix including alumina, silica, zeolite and porous carbon allotropes.

H. A composite prepared by the thermal or microwave treatment of a base (sodium, calcium, ammonium hydroxide or ammonia gas) treated, metal complexed, and 3-chloro-2-hydroxypropyl trimethylammonium chloride (cationic reagent) and/or 1,3-bis(trimethylammonium)-2-hydroxypropane dichloride bonded material where the metal is iron.

I. All products in items A through H above for the removal of dissolved phosphorous from contaminated water.

J. All products in items A through H above for the removal of dissolved arsenic from contaminated water.

K. All products in items A through H above for the removal of dissolved selenium from contaminated water.

L. All products in items A through H above for the removal of dissolved arsenic, phosphorus and selenium from contaminated water.

The embodiments are chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A method of producing metal nanocomposites, comprising:

providing a starting matrix material having at least one functional group capable of reacting with a quaternary amine compound (quat);

modifying the starting matrix material with a quat such that the at least one functional group reacts with the quat to form a function site at the starting matrix material and capable of chelating with a metal ion;

treating the quat modified matrix material with a metal salt such that a metal ion of the metal salt is chelated with the functional site of the quat modified matrix;

treating the metal and quat treated matrix material with an alkali such that a metal ion component chelated to the functional site is transformed to a metal hydroxide component chelated to a functional site; and heating the alkali, metal and quat treated matrix material for a period of time effective to form a plurality of metal nanocomposites, wherein a metal component from at least one of the metal nanocomposites is in a reduced oxidation state comparing with the metal in the metal salt, wherein the starting matrix material is selected from the group consisting of wood, cellulose, chitin, lignin, tannin, silk, protein, wool, chitosan, and derivatives thereof.

2. The method of claim 1, wherein the functional group of the starting matrix material is selected from the group consisting of amino group, hydroxyl group, thiol group, and combinations thereof.

3. The method of claim 1, wherein the quat is selected from the group consisting of 3-chloro-2-hydroxypropyl trimethlammonium chloride, 1,3-bis(trimethylammonium)-2-hydroxypropane dichloride, glycidyl trimethyl ammonium chloride, and combinations thereof.

4. The method of claim 1, wherein the metal ion of the metal salt is selected from the group consisting of $Fe^{3+}$, $Fe^{2+}$, $Ni^{2+}$, $Co^{2+}$, $Au^{3+}$, $Pt^{2+}$, $Pt^{4+}$, $Al^{3+}$, $Ti^{4+}$, $Ag^{+}$, $Pd^{2+}$, $Cu^{2+}$, $Cu^{+}$, $Mn^{2+}$, $Si^{4+}$, $Zr^{+4}$, $Sb^{+2}$, $Bi^{3+}$, $Zn^{2+}$, $Al^{3+}$, $W^{6+}$, $Ba^{2+}$, $Cr^{3+}$, $Sn^{4+}$, $Mo^{6+}$, and combinations thereof.

5. The method of claim 1, wherein the anion of the metal salt is selected from the group consisting of chloride, acetate, nitrate, sulfate, and combinations thereof.

6. The method of claim 1, wherein the alkali is selected from the group consisting of sodium hydroxide, potassium hydroxide, calcium hydroxide, ammonia solution (ammonium hydroxide), ammonia gas, and combinations thereof.

7. A method of producing metal nanocomposites, comprising:

providing a starting matrix material having at least one functional group capable of reacting with a quaternary amine compound (quat);

modifying the starting matrix material with a quat such that the at least one functional group reacts with the quat to form a function site at the starting matrix material and capable of chelating with a metal ion;

treating the quat modified matrix material with a metal salt such that a metal ion of the metal salt is chelated with the functional site of the quat modified matrix;

treating the metal and quat treated matrix material with an alkali such that a metal ion component chelated to the functional site is transformed to a metal hydroxide component chelated to a functional site; and heating the alkali, metal and quat treated matrix material for a period of time effective to form a plurality of metal nanocomposites, wherein a metal component from at least one of the metal nanocomposites is in a reduced oxidation state comparing with the metal in the metal salt, wherein the plurality of metal components of the metal nanocomposites is magnetic.

8. A method of purifying contaminated water, comprising:

contacting the contaminated water with a media containing the metal nanocomposites produced by the method of claim 1.

9. A method of producing metal nanocomposites, comprising:

providing a starting matrix material having at least one —OH group;

modifying the starting matrix material with a reagent such that the at least one —OH group reacts with the reagent to form a —O—CH$_2$—CH(OH)— group at the matrix material;

treating the matrix material with a metal salt such that a metal ion of the metal salt is chelated with the —O—CH$_2$—CH(OH)— group of the modified matrix material;

treating the matrix material with an alkali such that a metal ion component chelated to the —O—CH$_2$—CH(OH)— group is transformed to a metal hydroxide component chelated to —O—CH$_2$—CH(OH)— group; and subjecting the matrix material to microwave radiation for a period of time effective to form a plurality of metal nanocomposites, wherein a metal from at least one of the metal nanocomposites is in a reduced oxidation state comparing with a metal in the metal salt.

* * * * *